May 29, 1956 H. L. MUELLER 2,747,889
REACH BAR ASSEMBLY FOR BICYCLE FRAME
Filed Feb. 26, 1953
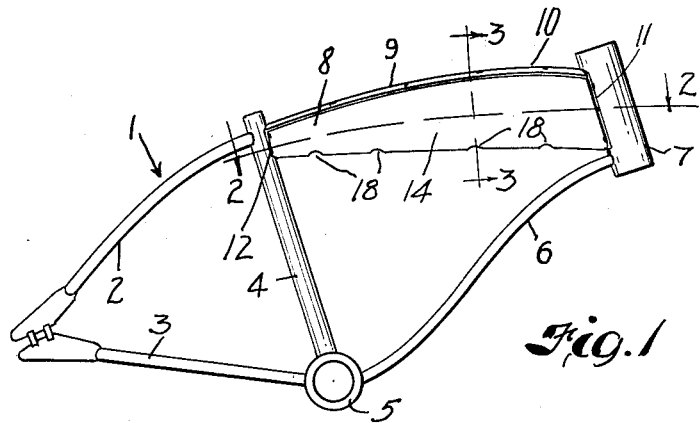
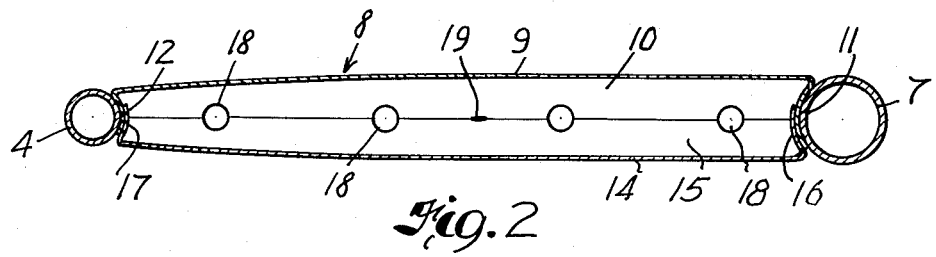
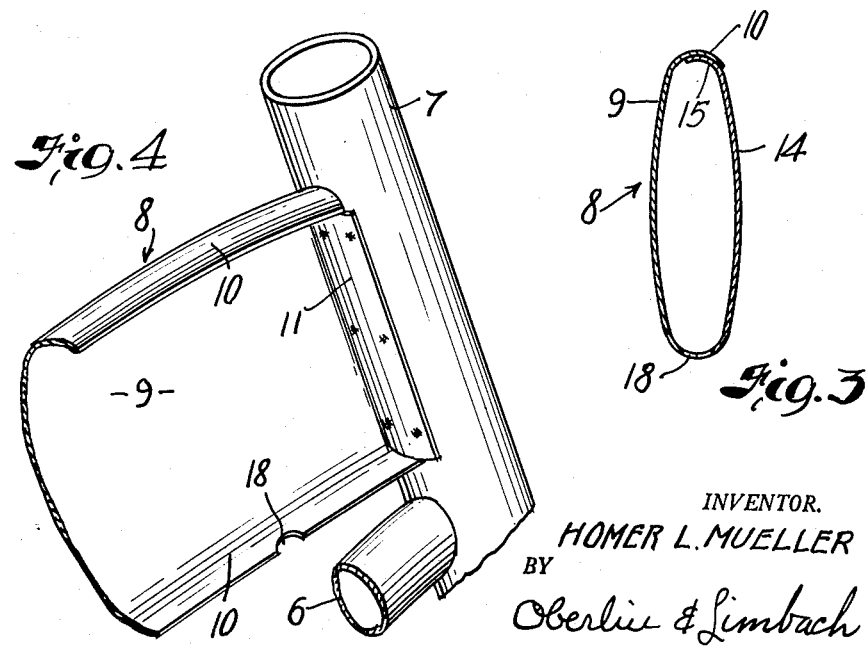
INVENTOR.
HOMER L. MUELLER
BY
Oberlin & Limbach
ATTORNEYS.

United States Patent Office 2,747,889
Patented May 29, 1956

2,747,889

REACH BAR ASSEMBLY FOR BICYCLE FRAME

Homer L. Mueller, Cleveland, Ohio, assignor, by mesne assignments, to American Machine & Foundry Company, a corporation of New Jersey Application February 26, 1953, Serial No. 339,049

2 Claims. (Cl. 280—281)

The present invention relates generally as indicated to a bicycle frame and more particularly to a bicycle frame which is of conventional welded tube structure except for the reach member which herein is in the form of a sheet metal shell rather than in the form of a pair of generally horizontally disposed tubes having their opposite ends welded to the tubular steering head and to the upper end portion of the saddle post mast of the frame.

It is one principal object of this invention to provide a bicycle frame of the character indicated which is economical to manufacture, is of adequate strength, and has an ornate appearance.

Another object of this invention is to provide a bicycle frame as aforesaid in which said improved reach member is adapted to be spot welded into assembled position between said steering head and said saddle post mast, thereby effecting further economies without sacrifice in durability and strength.

Another object of this invention is to provide a bicycle frame of which the reach member comprises complemental shells of which a basic part is first firmly secured in place in the frame and a cover part is then secured to said basic part in such a way as to strengthen the latter.

Another object of this invention is to provide a bicycle frame reach member which includes complemental shells as aforesaid wherein said basic part is sprung or slid into place in the frame and said cover part is similarly fitted into place with respect to said basic part in laterally overlapping and interlocking relation therewith for the welding together of the top generally horizontally extending overlapped edge portions through access openings provided in the bottom edge portions.

Another object of this invention is to provide a bicycle frame reach member which is fabricated from sheet metal to provide a box or tank-like structure of generally oval or elliptical transverse cross-section with concave cylindrical ends which interlockingly embrace said steering head and said saddle post mast.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail one illustrative embodiment of the invention, this being indicative, however, of only one of the various ways in which the principle of the invention may be employed.

In said annexed drawing:

Fig. 1 is a side elevation view of a bicycle frame which includes my improved reach member;

Fig. 2 is a cross-section view longitudinally of the reach member taken substantially along the line 2—2, Fig. 1;

Fig. 3 is a transverse cross-section view through the reach member taken substantially along the line 3—3, Fig. 1; and Fig. 4 is a fragmentary perspective view showing how the main part of my reach member is interlocked with and welded to the steering head of the bicycle frame.

Referring now more particularly to the drawing, there is shown in Fig. 1 a bicycle frame 1 which has the usual tubular rear fork members 2 and 3 joined together at their rear ends to provide a rear wheel mount and having their forward ends respectively welded to the upper end portion of a saddle post mast 4 and to a crank hanger 5. The lower end of said mast 4 is welded to said crank hanger 5. A diagonal member 6 also welded to said crank hanger 5 extends angularly upward therefrom and has its upper end welded adjacent the lower end portion of a steering head 7, the latter being adapted to journal therein the stem of a front wheel fork in well known manner. A reach member 8 extends generally horizontally between said head 7 and the upper end portion of said mast 4.

As shown herein, said reach member 8 is a fabricated sheet metal stamping of .045" sheet steel, for example, and is composed of a base part 9 having a peripheral rim or flange 10, the end portions 11 and 12 of which flange are of concave curved cross-section to interlock with said head 7 and said mast 4, respectively. Said head 7 and said mast 4 are usually parallel or nearly so so that said base part 9 may be slid down into place therebetween or, if desired, said base part may be laterally sprung or jumped into place, the end portions 11 and 12 being resilient. The latter expedient may be employed whether or not the mast 4 and head 7 are parallel. With reference to the sliding or springing of the base part 9 into place, it is to be noted that the concave end portions 11 and 12 extend beyond the center plane of the bicycle frame so as to laterally interlock with said mast 4 and said head 7. With the base part 9 thus positioned between said mast 4 and said head 7, the same may be securely spot welded into place at several points, as shown, adjacent the opposite edges of said end portions 11 and 12.

After said base part 9 has been spot welded as aforesaid, a cover part 14 is interlockingly sprung or slipped into place with the upper side of its flange or rim 15 fitting under the upper side of the flange 10 of said base part 9 and with its resilient end portions 16 and 17 snugly fitting and interlocking within the end portions 11 and 12 of said base part flange 10. Said end portions 16 and 17 and also said upper side of flange 15 extend beyond the central vertical plane of the bicycle frame 1 and are complemental with said base part flange 10 so as to be interlocked therewith.

The lower edges of said base part 9 and said cover part 14 preferably abut each other as shown without lateral overlap and the notches 18 formed in said lower edges define openings through which a spot welder electrode may be inserted to engage the under face of the longitudinally extending overlapped flanges 10 and 15. Thus, the shells 9 and 14 may be securely spotted together, and as a final operation, the abutting lower edges of said flanges 10 and 15 may be stitched or tacked together at one or more places 19 to securely hold the shells against spreading apart and to prevent rattling.

The two complemental shells so assembled provide an extremely strong, light-weight, ornamental structure of generally elliptical transverse cross section which is economical to manufacture and to assemble. The final appearance is generally the same as is achieved with a structure wherein a tool box or tank is disposed between reach tubes. I have found that the present construction is even more economical than the conventional structure wherein either one or two seamless tubes are fitted and arc welded or brazed into place between said mast 4 and said head 7.

Other modes of applying the principle of the invention may be employed, change being made as regards the details described, provided the features stated in any of the following claims, or the equivalent of such, be employed.

I therefore particularly point out and distinctly claim as my invention:

1. The combination with a bicycle frame of the type which includes a steering head and a saddle post mast, of a generally horizontally extending frame member having its opposite ends complemental with and laterally interlockingly secured to said head and said mast respectively, and comprising a pair of complemental shells of which one has a peripheral flange provided with resilient end portions laterally interlocked with said head and said mast whereby said one shell may be jumped into place and the other also has a peripheral flange with end portions which fit within the end portions of said one shell and with a longitudinally extending portion which is in laterally overlapped relation with a corresponding longitudinally extending portion of the flange of said one shell.

2. The combination with a bicycle frame of the type which includes a steering head and a saddle post mast, of a generally horizontally extending frame member having its opposite ends complemental with and laterally interlockingly secured to said head and said mast respectively, and comprising a pair of complemental shells of which one has a peripheral flange provided with resilient end portions laterally interlocked with said head and said mast whereby said one shell may be jumped into place and the other also has a peripheral flange with resilient end portions which are laterally interlocked within the end portions of said one shell whereby said other shell may be jumped into assembled relation with said one shell.

References Cited in the file of this patent

UNITED STATES PATENTS

| | | |
|---|---|---|
| 2,080,677 | Uber | May 18, 1937 |
| 2,088,244 | Kraeft | July 27, 1937 |
| 2,091,982 | Hart | Sept. 7, 1937 |
| 2,354,125 | Johnston | July 18, 1944 |
| 2,537,325 | Bowden | Jan. 9, 1951 |

FOREIGN PATENTS

| | | |
|---|---|---|
| 307,315 | Italy | Apr. 28, 1933 |
| 448,310 | Italy | May 16, 1949 |